Aug. 21, 1951  H. B. CRANE  2,564,780
ANIMATED DISPLAY APPARATUS
Filed March 3, 1948

INVENTOR.
HOWARD B. CRANE
BY Darby & Darby
ATTORNEYS

Patented Aug. 21, 1951

2,564,780

UNITED STATES PATENT OFFICE 2,564,780

ANIMATED DISPLAY APPARATUS

Howard B. Crane, Mamaroneck, N. Y.

Application March 3, 1948, Serial No. 12,733

4 Claims. (Cl. 40—52)

This invention relates to animated displays and particularly to an apparatus for the support and operation of different animated displays.

Animated displays used principally for advertising purposes comprise normally a relatively stiff sheet of cardboard or similar material having a desired scene painted thereon and containing an element having an oscillating movement to add interest and attract attention to the display. There is practically an unlimited number of scenes which may be displayed with a moving element. Heretofore, each of these animated displays has been constructed specifically for the scene or type of display, so that each is custom built. In other words, the small electric motor normally used to provide the motive power for the moving element is rigidly attached to the back of the cardboard on which the scene is painted at a position corresponding to the pivotal point of the moving element. When a change in the type or scene of animated display is made the entire display is removed including the motor or prime moving parts and an entirely new display is substituted having previously been made up with motor attached. This was necessary since the pivotal point of the moving member will occur at different positions on animated displays depending on the particular scene involved. Therefore, it was necessary to disassemble the animated display and reassemble a different display rigidly attaching the motor to the new display at the new pivotal point.

It is the object of this invention to provide a standard support or frame as an apparatus for animated displays which frame may be set in the desired display position and remain there while different displays are substituted, a plurality of supports being provided for one or more prime movers or motors to place the motor in a position corresponding to the pivotal point of the moving member for each animated display.

It is another object to provide an animated display frame adapted to receive and support different animated displays with readily adjustable means for varying the speed and extent of movement of the different moving elements dependent upon the type of display involved.

Other objects will be apparent after a study of the following description, claims and drawings in which—

Figure 1:
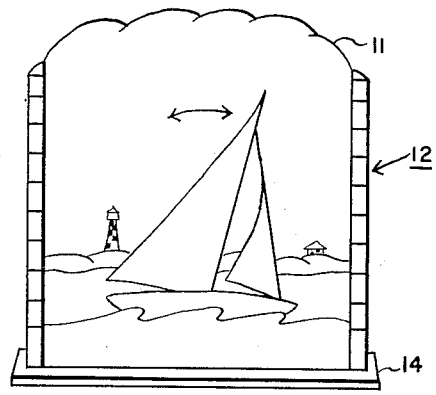
Figure 1 is a front view illustrating the animated display supported in the frame in accordance with this invention.

Referring now to Figure 1, an animated display is shown, illustrating in this particular case, a sailboat, which in animated or moving form, is rocking or rolling. This particular scene 11 is supported by a frame 12. The entire boat being the moving member in this particular display, the pivotal point 13 is located near the lower center portion of the scene.

Figure 2:
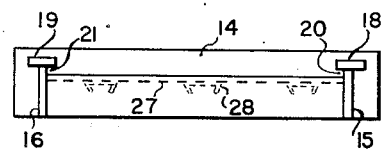
Figure 2 is a top view of the frame.

The scene has been painted on a relatively thin but stiff material, such as cardboard, which has been made to a size corresponding to the dimensions of the frame 12. As may be seen more clearly by referring to Figures 2 and 3, the frame 12 comprises a base 14 with two upright supports 15 and 16 extending from the ends thereof. A top member 17 extends across the top of the upright supports 15 and 16, the width of the member 17 being slightly less than the width of the base 14 and upright supports 15 and 16. Two front panels 18 and 19 are attached to the front edge of the supporting members 15 and 16 so as to extend inwardly for a short distance across the open face of the resulting frame. With this construction, as may be seen in Figure 2, channeled slots 20 and 21 result on both sides on the front of the frame.

The animated display 11 is readily inserted in the top of the frame to slide downwardly in and be supported within the slots 20 and 21, the bottom of the display resting on the base 14. With this construction, it is apparent that any number of display scenes having dimensions corresponding to the dimensions of the frame may be readily inserted and removed at any time in or from the display frame 12. Thus the display frame may be set in position in a show window, for instance, and any number of displays may readily be substituted as often as desired.

Figure 3:
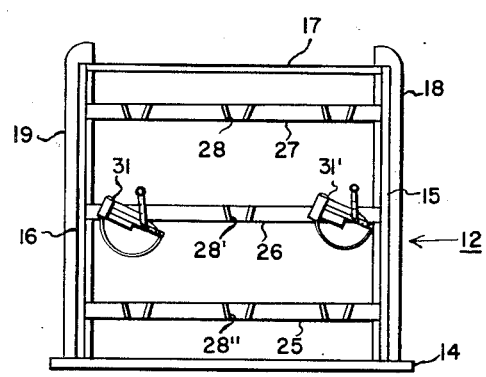
Figure 3 is a rear view of the frame.

As may be seen in Figure 3, a plurality of horizontal members 25, 26, and 27 extend between and are supported by the upright supports 15 and 16 of the frame 12. These cross supports 25, 26 and 27 are attached near the forward edge of the upright supports 15 and 16 in alignment with the leading or forward edge of the top member 17. In this position they do not extend into the slots 20 and 21 and thus do not interfere with the positioning of the display 11 in the frame 12. However, they are adjacent to the back of the display 11 when the display is in position in the frame 12.

Figure 4:
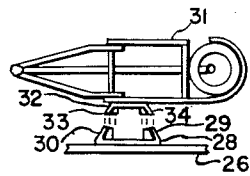
Figure 4 is a top view showing the type and positioning of the brackets for supporting the motor.

A small bracket 28, preferably metal, is utilized to support a motor in this display apparatus. As may be seen in Figure 4, the bracket preferably comprises a plate having the vertical edges 29 and 30 thereof bent inwardly slightly more than 90° so as to form V's on each side thereof. The top lateral dimension of the bracket 28 is greater than the lower lateral dimension so that the resultant structure of the bracket 28 is in the nature of a V.

A plurality of these brackets 28 are mounted on the back of each of the cross members 25, 26 and 27. This is illustrated in Figure 3 in which the brackets are identified by the numerals 28, 28', 28", etc.

The prime mover or motor for the animated display apparatus in accordance with this invention may be any well known type motor used today in animated display services. One of the popular types is that comprising an oscillator adapted to be set in oscillating motion by means of a solenoid or electromagnetic coil the motion being imparted to a supporting arm which may carry the moving member of the animated display. Such a motor is identified at 31 in the drawings.

A bracket 32 complementary to the bracket 28, is attached to the motor 31. As may be seen, the bracket 32 comprises a plate having the same dimensions as the bracket 28 with the vertical edges 33 and 34 thereof bent at an angle less than 90° complementary to the angle of the edges 29 and 30 of the bracket 28. With this arrangement, the motor 31 may be supported by the cross members 25, 26 or 27, simply by inserting the bracket 32 on the bracket 28. The bracket 28 will support the bracket 32 and the motor 31, and the particular construction shown and described enables the motor to be readily inserted or removed in place on the back of the frame 12.

Since a plurality of brackets 28 have been provided on each of the plurality of cross supports 25, 26 and 27, a number of positions are available for the motor 31 in relation to the animated display 11. While three cross supports 25, 26 and 27 have been illustrated, it is apparent that any number may be used if desired, depending upon the conditions. Also, it is apparent that any number of brackets 28 may be mounted on each cross support. In this way, a large number of positions are made available for the motor 31.

Thus for any particular animated display, the display scene 11 is readily slipped in position in the frame 12 as previously described. The motor 31 is then readily slipped in position in the particular bracket 28 on the back of the frame corresponding to the pivotal position of the moving member of the particular animated display being used. Thus it is apparent that any number of animated displays may readily be substiuted with a minimum of time and a maximum of ease. The change in display may take place on location, which may for instance, be a show window.

The amount or speed of movement of the oscillating or moving member of the oscillating display will vary dependent upon the scene. Therefore, there is provided in accordance with this invention, a means of readily controlling the operation of the motor 31 to cause oscillation at a variable rate and movement over a controllable distance. For this purpose, as may be seen in Figure 5, an L-shaped member 41 is provided, having a plurality of holes 42 along one leg 43 of the L and a plurality of holes 44 along the other leg 45 of the L. A corresponding hole is provided on the frame of the motor 31 and a pin 46 may be used to attach the L-shaped member 41 to the oscillating or moving portion of the frame of the motor 31.

Figure 5:
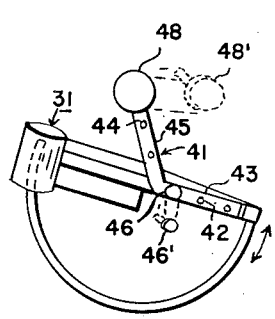
Figure 5 is a view of the motor illustrating the adjustable means for regulating the movement of the motor.

A counterweight 48 in the form of a pin with a weighted head may be inserted in any one of the holes 44 on the leg 45 of the L member 41. It will be apparent from Figure 5 that the oscillating movement of the motor will be dampened by the action of the counterweight 48. The amount of control or damping may be varied by changing the position of the counterweight 48 on the leg 45. Similarly the position of the L member 41 on the oscillating part of the frame of the motor 31 may be varied by utilizing the different holes 42 along the mounting leg 43. In Figure 5, a pin 46 and the counterweight 48 are laso shown in dotted lines spaced from the L-shaped member 41 and bearing respectively the reference numerals 46' and 48' to illustrate that these elements are removable and selectively insertable in the various openings as described. Thus, this L-shaped attachment 41 for the motor 31 provides variable counterweight and driving pin positions permitting adjustment or control of speed and extent of movement of the oscillating or moving member of the display. The motor 31 is adaptable to various requirements on different animated displays.

It will be apparent that a plurality of power units or motors may be used on a single display if desired with both the position and operation of the motors being adjustable to suit the replaceable varying scenes.

While the preferred embodiment of this invention has been illustrated and described, it will be apparent that various modifications may be made without departing from the scope of the invention.

What is claimed is:

1. An animated display frame comprising a base, upright supporting members on said base, a plurality of motor supporting members supported by and between said upright members, said frame having channel slots to receive and support said display.

2. An animated display frame comprising a base, upright supporting members on said base, a plurality of cross members supported by and between said supporting members, a plurality of brackets on each said supporting member for supporting a motor for moving an element of said display, said frame having vertical channels on each side of the front thereof to receive and support the display scene.

3. Animated display apparatus comprising a frame, a mounting bracket on said frame and an electrical motor supported on said bracket, said motor having a stationary portion and an oscillating portion pivotally mounted thereon, an L-shaped member having a first leg thereof secured to said oscillating portion in selectively variable position longitudinally thereof, and a weight attached to a second leg of said L-shaped member and selectively variable in position longitudinally thereof, the position of said weight and said second leg controlling the movement of said oscillating portion of said motor.

4. A motor for an animated display comprising a stationary portion and an oscillating portion pivotally mounted thereon, an L-shaped member having a first leg thereof secured to said oscillating portion in selectively variable position longitudinally thereof, and a weight attached to a second leg of said L-shaped member and selectively variable in position longitudinally thereof, the position of said weight and said second leg controlling the movement of said oscillating portion of said motor.

HOWARD B. CRANE.

REFERENCES CITED

The following references are of record in the file of this patent:

UNITED STATES PATENTS

| Number | Name | Date |
|---|---|---|
| 1,026,531 | Sperry | May 14, 1912 |
| 2,018,577 | Ruckelshaus | Oct. 22, 1935 |
| 2,260,658 | Connors | Oct. 28, 1941 |
| 2,473,049 | Bledsoe | June 14, 1949 |